May 19, 1970 J. S. HAWLEY 3,513,461

DIGITAL DATA SYSTEM AND APPARATUS

Filed Oct. 17, 1966

8 Sheets-Sheet 1

INVENTOR.
JACK S. HAWLEY

BY Flehr, Hohbach, Test, Albritton and Herbert

ATTORNEYS

INVENTOR
JACK S. HAWLEY
BY Fehr, Hohbach, Test, Albritton and Herbert
ATTORNEYS

May 19, 1970 J. S. HAWLEY 3,513,461

DIGITAL DATA SYSTEM AND APPARATUS

Filed Oct. 17, 1966

8 Sheets-Sheet 3

INVENTOR.
JACK S. HAWLEY

BY Flehr, Hohbach, Test, Albritton and Herbert

ATTORNEYS

INVENTOR.
JACK S. HAWLEY
BY
Flehr, Hohbach, Test, Albritton and Herbert
ATTORNEYS May 19, 1970 J. S. HAWLEY 3,513,461

DIGITAL DATA SYSTEM AND APPARATUS

Filed Oct. 17, 1966

8 Sheets-Sheet 5

INVENTOR.
JACK S. HAWLEY

BY
Flehr, Hohbach, Test, Albritton and Herbert
ATTORNEYS

May 19, 1970 J. S. HAWLEY 3,513,461

DIGITAL DATA SYSTEM AND APPARATUS

Filed Oct. 17, 1966 8 Sheets-Sheet 6

INVENTOR.
JACK S. HAWLEY
BY Flehr, Hohbach, Test, Albritton and Herbert
ATTORNEYS INVENTOR.
JACK S. HAWLEY
BY
Fleht, Hohbach, Test, Albritton and Herbert
ATTORNEYS INVENTOR.
JACK S. HAWLEY
BY Flehr, Hohbach, Test, Albritton and Herbert
ATTORNEYS

United States Patent Office 3,513,461
Patented May 19, 1970

3,513,461
DIGITAL DATA SYSTEM AND APPARATUS
Jack S. Hawley, Berkeley, Calif., assignor to Berkeley Instruments, Oakland, Calif., a corporation of California
Filed Oct. 17, 1966, Ser. No. 587,015
Int. Cl. G08c *19/28*
U.S. Cl. 340—206 6 Claims

ABSTRACT OF THE DISCLOSURE

A multiple revolution digitizer for measuring, for example, stream level in feet and in hundredths of a foot converting the analog information to a serial pulse train of digital information suitable for telemetering. Hundredths of feet are measured by an inch wheel having a reflective half and a nonreflective half. A foot wheel includes a commutator counter band of two hundred segments to provide a digital count by movement of a brush across the segments.

This invention relates to a digital data system and apparatus and more specifically to a system and apparatus which is particularly adapted for use with analog transducers which are variable over a wide range.

In U.S. Pat. 3,253,260 which issued May 24, 1966 to the present inventor and is entitled "Digital Data System and Apparatus" there is disclosed a system for collecting analog data, e.g., the indication of a dial type instrument such as a thermometer, and converting this data to digital information. Copending U.S. application Ser. No. 230,149, filed Oct. 12, 1962, now Pat. No. 3,289,165 in the name of Jack S. Hawley et al., and entitled "Programming and Telemetering System and Apparatus" shows a system for gathering the digitized information at a remote location and telemetering this information in the form of serial synchronous binary signal to a central station.

Where digital data systems have been required to handle analog information of a wide range of values with reasonable accuracy, the analog information has been broken down into coarse and fine data; for example, feet and inches or hundredths of a foot. This has created many problems. A major and inherent one is the possible ambiguity in the coarse analog data when the fine data is at the maximum of its scale. For example, if feet and hundredths of a foot are being measured, a problem exists between .00 and .99 feet. Prior attempts to solve the ambiguity problem have resulted in either complex mechanical arrangements or complicated electrical circuitry associated with the digitizer.

During the digitizing procedure some prior devices have locked the analog transducer to allow sufficient time for digitizing the analog information. This may produce large mechanical strains on the apparatus and is undesirable.

Another desired feature of a digital data system of the coarse-fine type is that it presents no internal drag on the analog input. Errors are introduced in this manner. Lastly, since telemetering systems already exist which process digital data from remote locations as shown in the above copending application, any other type of digitizer should be compatible.

In general, it is an object of the present invention to provide a digital data system and apparatus which overcomes the above disadvantages and provides the above named features.

Another object of the invention is to provide a digital data system and apparatus of the above character which digitizes analog information having a relatively wide range by converting it to coarse and fine analog information and then separately digitizing this information.

Another object of the invention is to provide a digital data system of the above character in which the analog transducer with which the system is associated is not locked during the measurement procedure.

Another object of the invention is to provide a digital data system and apparatus in which ambiguity between the coarse and fine analog information is inhibited in a simple and economical manner.

Another object of the invention is to provide a digital data system and apparatus which presents no drag on the analog transducer means.

Another object of the invention is to provide a digital data system and apparatus of the above character which is compatible with existing telemetering systems allowing pre-existing systems to be easily expanded.

Additional objects and features of the invention will appear from the following description in which the preferred embodiments are set forth in detail in conjunction with the accompanying drawings.

Referring to the drawings.

Figure 1:
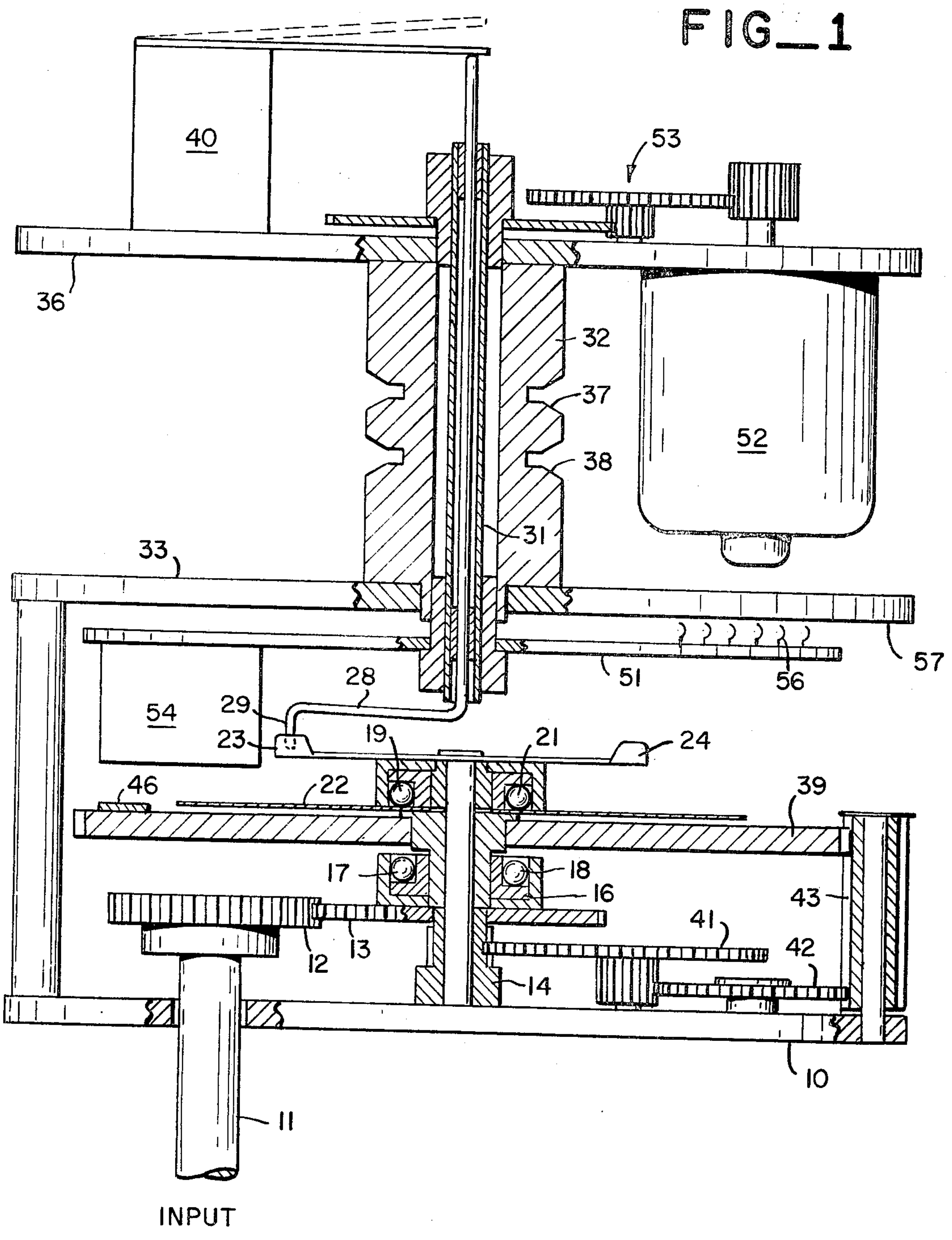
FIG. 1 is a cross sectional view of apparatus embodying the invention.
Figure 6:
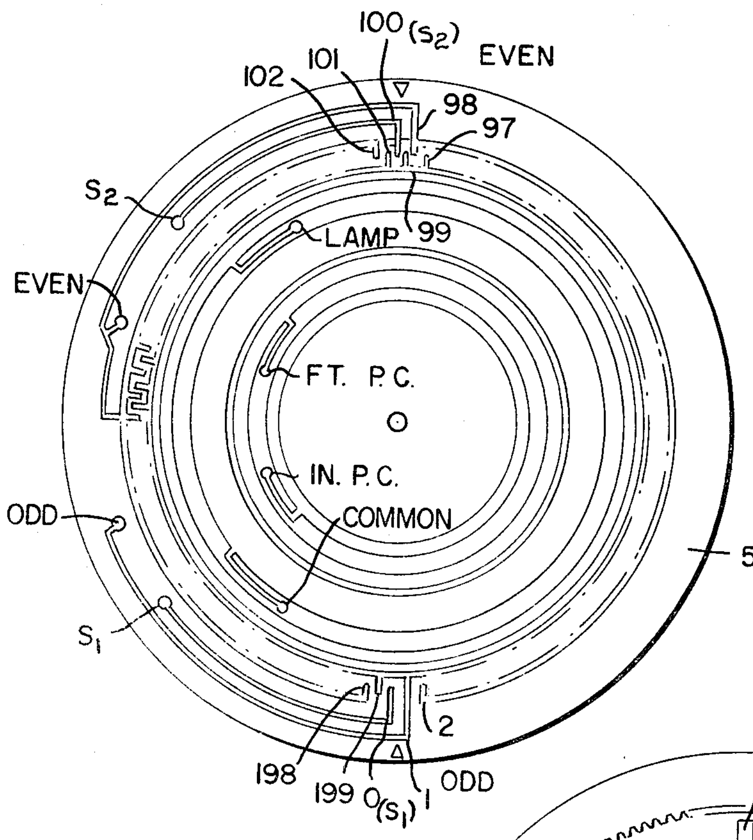
Figures 2, 3:
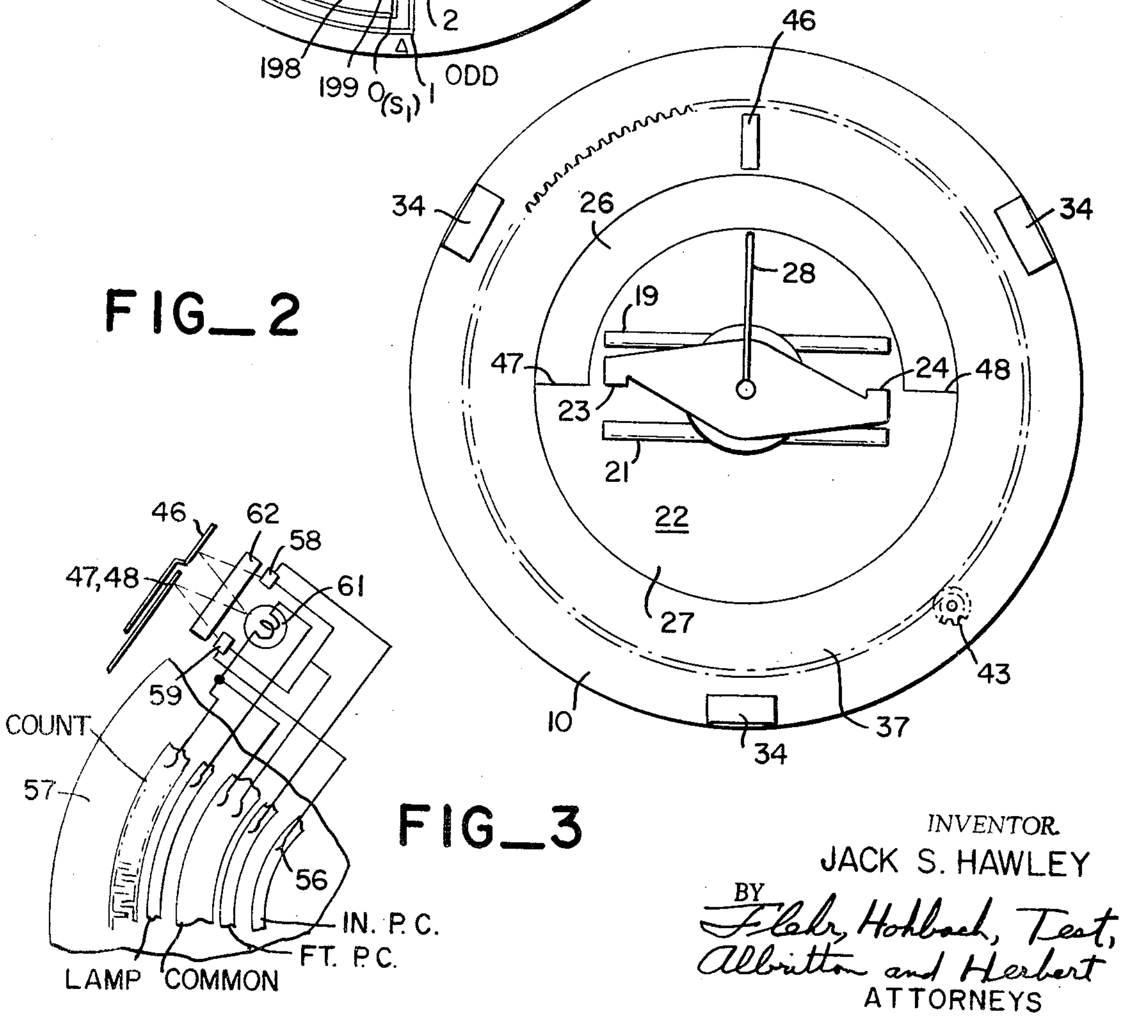
FIG. 2 is a plan view of a portion of FIG. 1.
FIG. 3 is a plan view of another portion of FIG. 1.
Figure 5A:
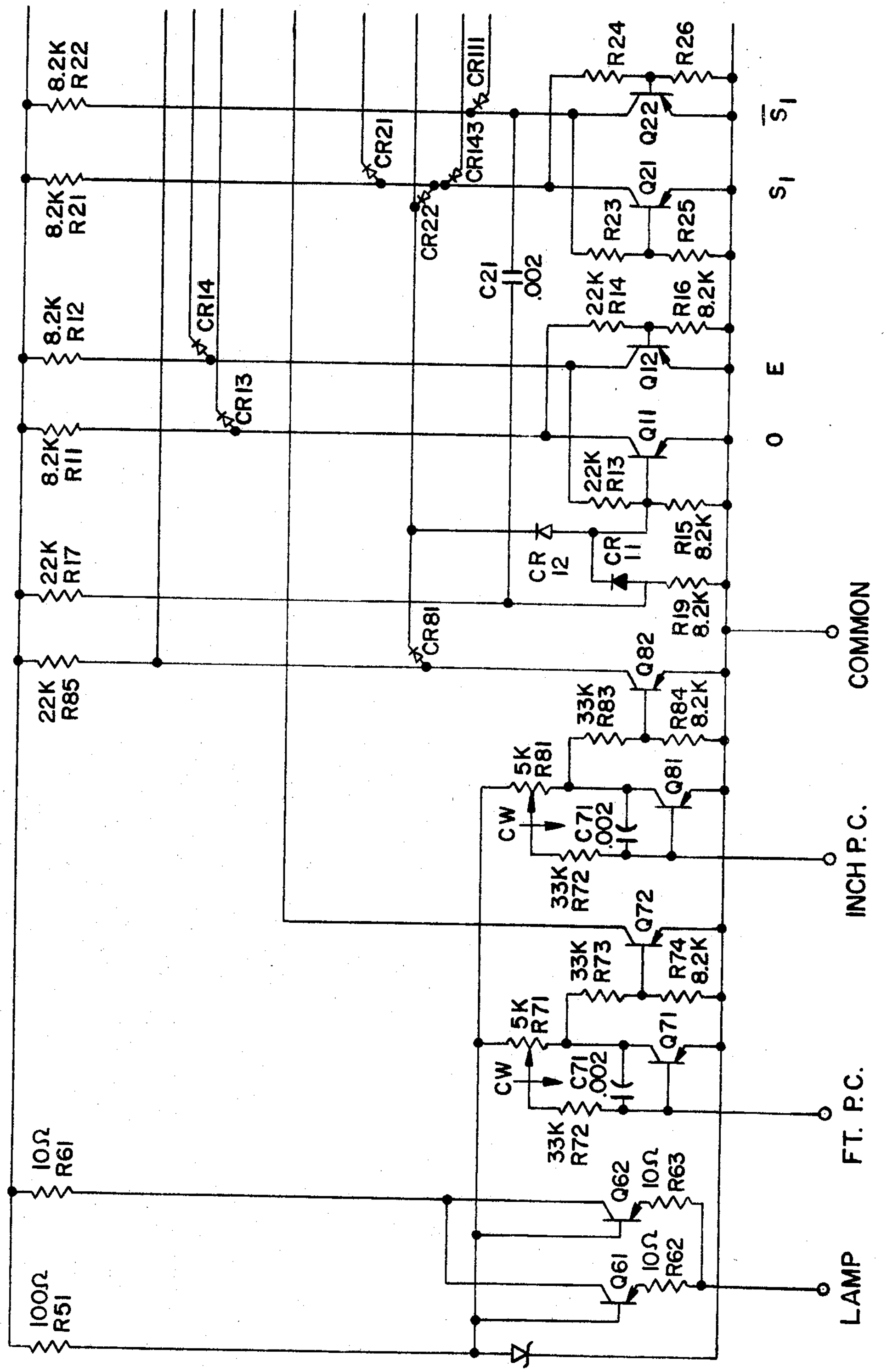
Figure 5B:
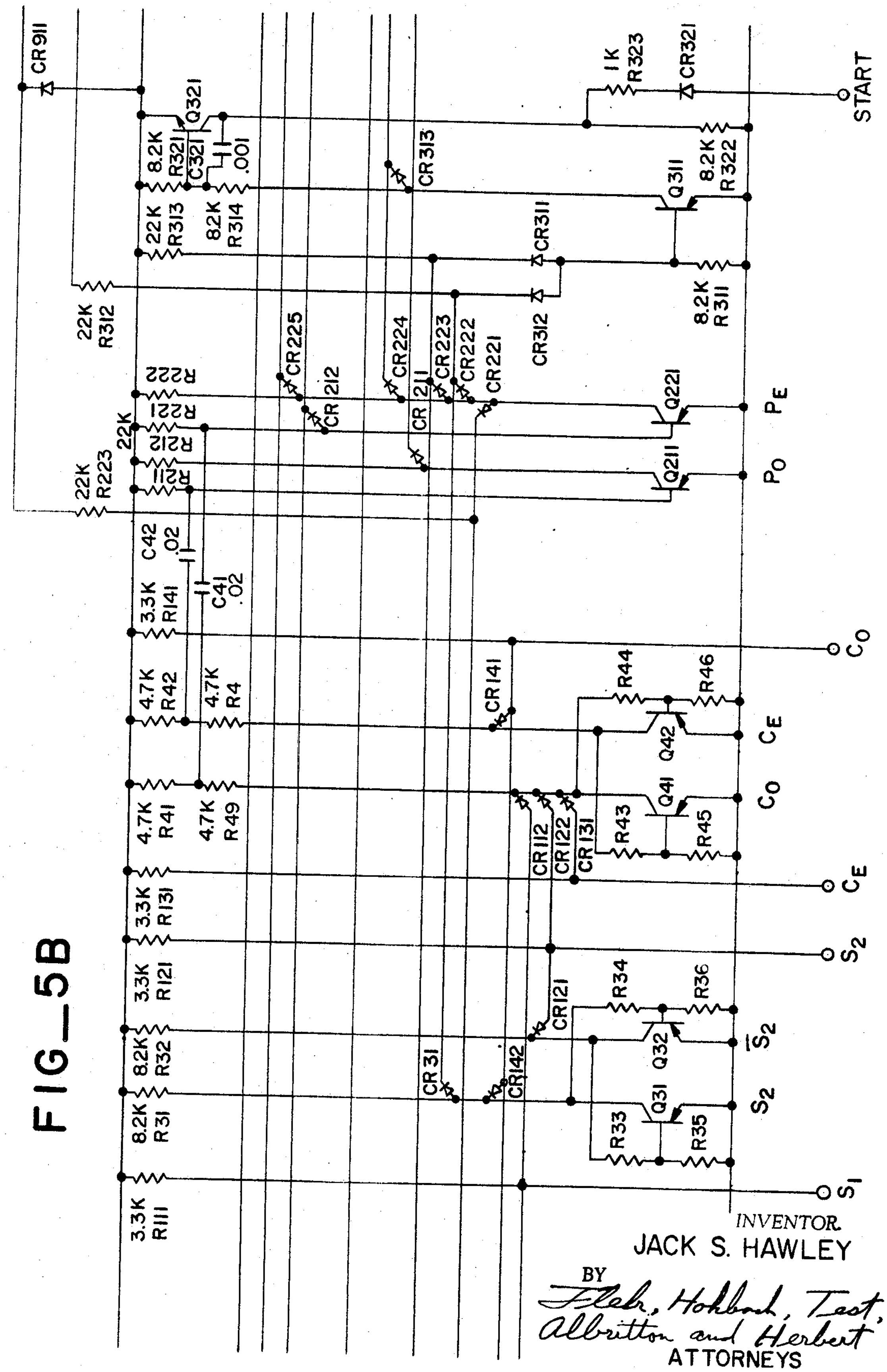
Figure 5C:
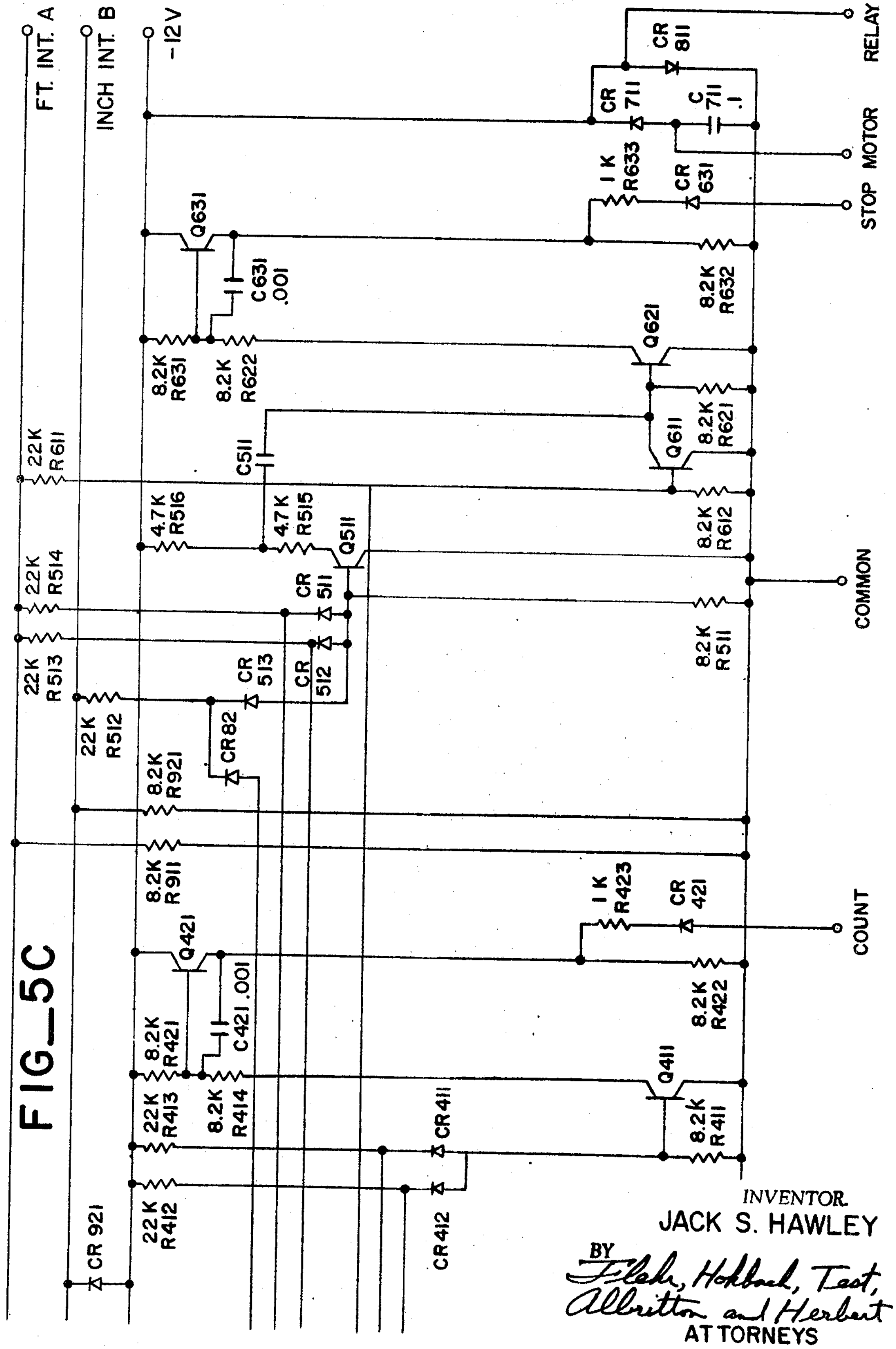
Figures 7A, 8A:
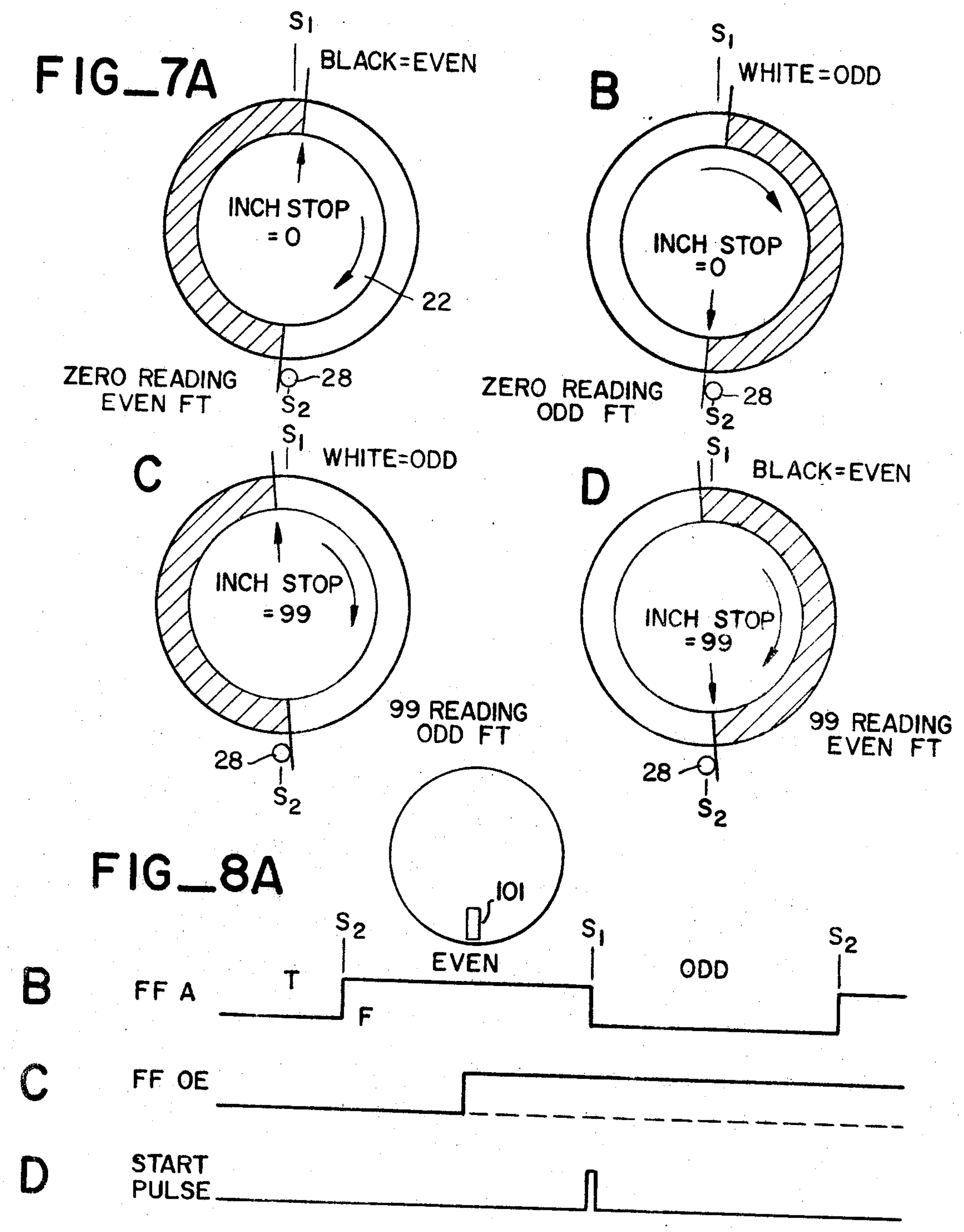
Figure 9:
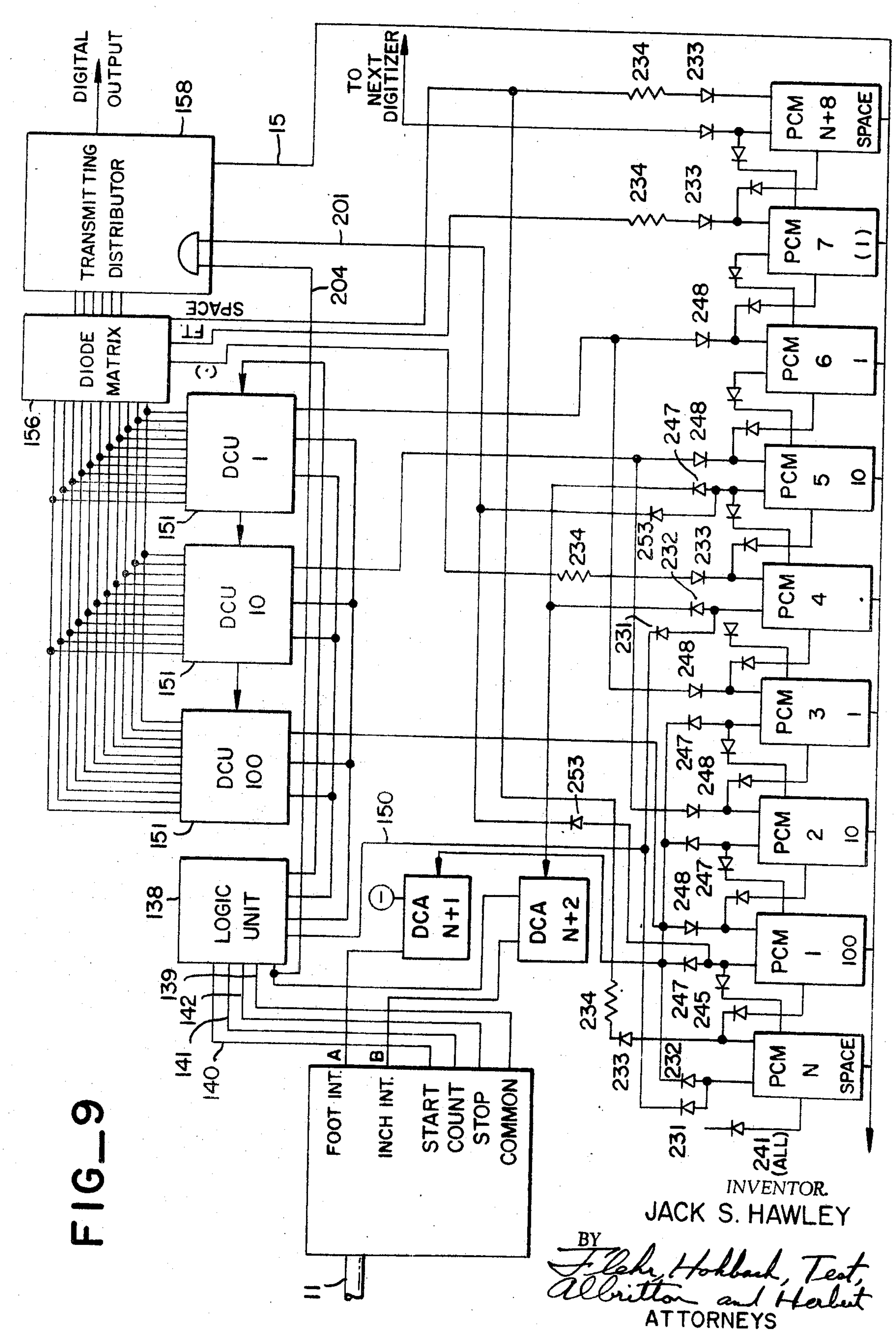

FIGS. 4A–Q are timing diagrams useful in understanding invention;

FIGS. 5A, 5B and 5C are schematic diagrams of circuits used in the present invention;

FIG. 6 is a diagrammatic view of a portion of FIG. 1;

FIGS. 7A–D show a portion of FIG. 2 in diagrammatic form in four different positions;

FIG. 8A is a plan view of another embodiment of a portion of the invention shown in FIG. 2;

FIGS. 8B–D are timing diagrams useful in understanding the embodiment of FIG. 8A; and FIG. 9 is a block diagram of a logic circuit for controlling the digitizer of the present invention and converting digitized information to binary information.

The above mentioned Hawley patent discloses in general form a digital data system in which analog quantities such as temperature, pressure, speed, time, position, etc. provide a physical output which is in the form of a shaft position or shaft velocity. A digitizing means is connected to the analog device for translating the physical quantity into a plurality of pulses or electrical signals. A logic unit is coupled to the digitizing means which controls the interrogation of the digitizer and in addition converts the digital pulses to any other desired forms such as binary synchronous data.

The present invention as illustrated in FIG. 1 includes a shaft position digitizer which indicates the extent of displacement of an element from a base position. The digitizer is mounted on a base 10 through which an input shaft 11 extends the shaft being coupled to the displaceable element. A pinion 12, which is affixed to shaft 11 meshes with pinion gear 13 which is journalled to a shaft 14 which is fixed on base 10. Shaft 11 and gear 12 turn two revolutions for every single turn of gear 13. Thus, for example, if one revolution of shaft 11 represents a foot, a single revolution of gear 13 represents two feet.

Also fixed to gear 13 are magnetic coupling means 15 which consist of two magnetic bars 17 and 18 mounted for rotation on gears 13. These couple magnetically to similar magnetic bars 19 and 21 which are fixed to inch wheel 22 which in turn is mounted for rotation on shaft 14.

Inch wheel 22 is so denoted since it rotates once for every two feet of input and thus is the fine indication of the analog input information. The plan view of this wheel is shown in FIG. 2 and it includes locking lugs 23 and 24 which are turned up portions of a flat metal piece fixed to the wheel. On the surface of the wheel itself is a semicircular reflective portion 26 the remainder 27 of the wheel being non-reflective or black. Black portion 27 represents an even foot and reflective portion 26 an odd foot. Gear 13 is magnetically coupled by the magnetic rods to wheel 22 unless the rotation of the wheel is prevented by a stop or odd-even selector 28. This occurs when an end 29 of selector 28 vertically descends to arrest movement of the inch wheel by engaging either lug 23 or lug 24. Odd-even selector 28 thus limits rotation of the inch wheel 22 to either an odd or even foot with relation to a reference point. This is more clearly indicated in FIG. 2 where lugs 23 and 24 are aligned with the separation between the white and black portions 26, 27.

Odd-even selector 28 is mounted for vertical movement in a shaft 31 which is journalled between two ends of a mounting column 32. One end of the mounting column is fixed to a top support plate 33 joined to a base plate 10 by three spacers 34 (only one of which is shown) the support column 32 having fixed to its top portion a mounting plate 36. Column 32 includes notches 37 and 38 into which may be placed printed circuit boards for electronic components. A relay 40 fixed to plate 36 causes vertical displacement of selector 28 when activated.

Gear 13 is also coupled to a foot wheel 39 (see FIGS. 1 and 2) through a gear train consisting of a compound gear 41 mounted for rotation on base 10 which couples to pinion gear 13 and an idler gear 42 also mounted for rotation on base 10. Gear 42 meshes with an elongated pinion gear 43 mounted for rotation on base 10 which finally meshes with the toothed edge of foot wheel 39. The gear ratios are so arranged that one revolution of foot wheel 39 represents 200 feet. Thus, the ratios between foot wheel 39 and inch wheel 22 is one hundred to one.

Foot wheel 39 and inch wheel 22 are the coarse and fine analog information indicators of the digitizer of the present invention. In the preferred embodiment as will be discussed in detail below, the inch actually measures $\frac{1}{100}$ of a foot but for convenience of explanation it will still be referred to as the inch wheel. In actual practice with slight modifications in the system the inch wheel could easily measure eighths, twelfths or sixteenths of an inch.

Indicating means which are indicative of the angular position of both the foot and inch wheels include on foot wheel 39 an elongated mirror 46 which is fixed to the foot wheel for rotation with it. The mirror area extends just beyond the periphery of inch wheel 22. Indicating means for the inch wheel 22 are provided by the white to black transitions 47 and 48.

Scanning means for sensing the positions of the indicating means include a rotor 51 which is affixed to the end of shaft 31 which is driven at a predetermined speed by a motor 52 through a gear train 53. Rotor 51 is in actuality a printed circuit board which carries at its left end a mounting head 54 and at the other end six wiper or commutator arms 56 which engage annular bands or strips on a commutator board 57 which is the lower face of support member 33. Details of the rotor construction are shown in FIG. 3. Mounting head 54 includes photocathodes 58 and 59, photocathode 58 being associated with foot reflector 46 and photocathode 59 with the inch indicating means 47, 48. A lamp 61 projects light as indicated by the light ray paths through a lens 62, which as the lens passes above the reflective surfaces will reflect light back to photocathodes 58 and 59. Commutator board 57 is provided with five conducting annular bands labeled count, lamp, common, foot photocathode, and inch photocathode. The foot and inch photocathode bands are respectively coupled by wipers 56 to one terminal of photocathodes 58 and 59, a common return line for the other terminals of the photocathodes being provided to common. Lamp 61 is coupled between the lamp commutator strip and common, and finally an interdigititated conductor strip labeled count is coupled to the common strip by an inter connection on the printed circuit board 51. As the rotor 51 is swept around by motor 52 the wiper 56 corresponding to the count strip passes over alternate interdigitated portions of the strip to produce successively odd and even digital count pulses as will be explained in detail below.

Odd-even selector 28 of FIG. 1 is vertically displaced downward on activation of the scanning means by energization of relay 40.

Commutator board 57 is shown in greater detail in FIG. 6 where the lamp, common, foot photocathode and inch photocathode bands are appropriately labeled and the count band is shown in significantly greater detail. The outer ring of conductive segments represents an even count and the inner ring an odd count. Representative segments are indicated on the drawing. Two hundred counts are provided on the entire count strip, starting from zero which is a first starting point labeled $S_1$ going through $S_2$ (100) a second starting point for the inch count and back to $S_1$.

All of the output terminals on FIG. 6 appear in FIG. 5A on the commutator connections. In addition, FIG. 5C shows connections to energize motor 52 and relay 63. In general, FIGS. 5A–C show circuitry which would normally be mounted on the column 32 of the digitizer on printed circuit boards. The circuitry manipulates the digital input pulses from the commutator to resolve ambiguities between coarse and fine measurements and to provide for compatability with existing telemetering systems which would be at a central station.

The operation of the digitizer is best explained in conjunction with FIGS. 5A–C.

As previously discussed in conjunction with FIG. 3, the commutator board has the following output terminals: lamp; coarse or foot photocathode; fine or inch photocathode; a common or ground line; a START, $S_1$; STOP, $S_2$, count even, *Ce*; and count odd, *Co*. All of these commutator terminals are coupled to the appropriately indicated terminal in FIG. 5A. A positive voltage is produced on the photocathode terminals, upon activation of the photocathodes. A negative voltage is provided by the lamp terminal to energize the lamp, and finally the commutator board provides for a predetermined making of electrical contact between the $S_1$, $S_2$, *Ce* and *Co* terminals and the common line.

The remaining two inputs are from the logic circuits which will be discussed in detail later. These are the foot interrogate terminal, A, and the inch interrogate terminal, B.

Digitizer outputs consist of start, count, common and stop. All of these are coupled into the logic circuitry as will be indicated.

The operation and arrangement of the circuitry of FIGS. 5A–C will be explained in conjunction with the waveform and timing diagrams of FIG. 4. In addition the commutator diagram of FIG. 3 will be referred to. Initially the logic circuit carries out the interrogation of the foot count by energizing the A terminal. This provides through the diode CR 911 and through other interconnections to be described later, a negative voltage (in this case of approximately minus twelve volts) on a common negative line as indicated. Immediately the motor terminal is energized causing the scanner to start rotating and the relay 40 is closed locking the inch wheel. A time relay is built into the device as discussed in the previously mentioned patent application to allow for warm-up of the motor and associated electronic components.

From an overall viewpoint the first piece of information to be gathered from the digitizer is the coarse, or in this case, the foot count. This count in relation to the commutator is the number of segments between the start, $S_1$, and the stop mirror on the coarse or foot wheel 37. In addition, to guard against the effects of backlash due to gearing and ambiguity in the zero ninety-nine or transitional point of the inch wheel, the circuit of FIGS. 5A–C provides certain improvements in accordance with the present invention.

Figure 4:
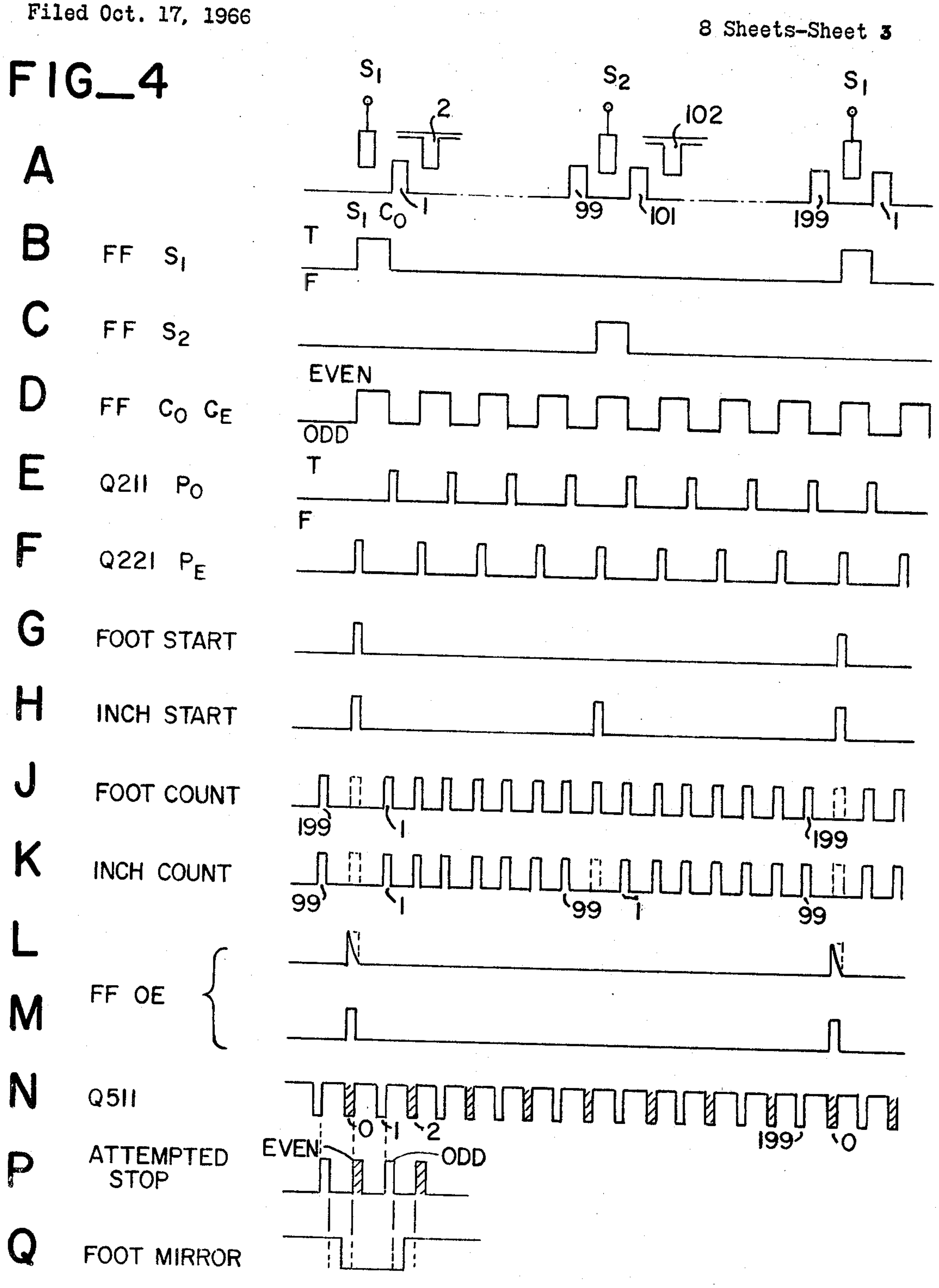

The waveform and timing diagrams of FIG. 4 illustrates the switching actions occurring in FIGS. 5A–C with relation to the commutator "count" band of FIG. 4A. More specifically a start output pulse is provided by turning the transistor Q311 in an on condition which in turn actuates transistor Q321 to conduction thus placing a minus voltage on the start terminal through resistor R323 and diode CR321. Actuation of the base of transistor Q311 by a negative voltage is provided in the following manner. Referring to FIG. 4A in conjunction with FIGS. 5A–C, when the wiper associated with the scanning head passed the $S_1$ terminal on the commutator, the terminal is grounded clamping the transistor Q22 to ground or common through diode CR111. Since Q22 and Q21 form a flip flop, transistor Q21 assumes an off condition in response to the grounding of Q21, which results in a negative potential on its collector lead which extends to the negative voltage supply source. In FIG. 4B the output pulse of flip flop $S_1$ is shown with the negative potential condition indicated as a "true" condition, a ground condition being "false." The true condition of the $S_1$ flip flop continues until it is again switched by a grounding of the count odd, *Co*, commutator lead which occurs on the number "one" count. Grounding of *Co* clamps the collector of Q21 to ground through diode CCR143. FIG. 4C shows a similar relationship with the $S_2$ flip flop where $S_2$, when grounded, clamps the collector of Q32 to ground through CR121 placing a negative or true voltage on the collector of Q31. Thereafter an odd count, *Co*, reverses the $S_2$ flip flop to its previous condition by the clamping of the collector lead of Q31 to common through diode CR142. However, it should be kept in mind at this point that for the coarse or foot count, only the $S_1$ start is of consequence since the total commutator counter band of 200 segments is utilized.

After the start count output count pulses are provided as shown in FIG. 4D by the odd-even flip flop (*Ce*, *Co*) the even and odd counts sequentially clamping the collectors of Q41 and Q42 to ground through diodes CR131 and CR141 respectively. The start count, $S_1$, is also an even count and thus is also coupled to the collector Q41 through CR112. Start count $S_2$ is also coupled to Q41 through CR122. The collectors of Q41 and Q42 are coupled to the minus voltage supply line and in addition to capacitors C41 and C42. The other terminals of the capacitors are coupled to the base inputs of transistors Q211, which is associated with the odd count, and transistor Q221, which is associated with the even count. The base terminals of Q211 and Q221 are also coupled through resistors to the minus supply voltage. In the absence of any actuation of the commutator terminals *Ce* and *Co*, capacitors C41 and C42 are charged to the negative supply voltage and transistors Q211 and Q221 are both in and on condition due to this negative voltage on their base terminals. However, when an even count is received, the grounding of *Ce* causes a discharge of the capacitor C41, which grounds the base input of Q221 to momentarily turn off the transistor, producing a negative or true voltage on the collector lead of the transistor. This voltage pulse is shown in FIG. 4F. Similarly, an odd count grounds the collector of Q42 discharging capacitor C42 to turn Q211 off as shown in FIG. 4E.

A start pulse, $S_1$, for the counting of feet is finally produced (FIG. 4G) by the coincidence on the base input terminal of Q311 of a negative base input voltage through R313 and CR311 from the common negative voltage line and the unclamping of CR312 from ground by the combined action of the $S_1$ flip flop placing a negative or true voltage on CR21, and a negative or true voltage occurring on the collector of Q221 which unclamps CR223.

Similarly for a start pulse in conjunction with the fine or inch wheel (FIG. 4H) and $S_1$ start is produced in the same manner and an $S_2$ start pulse is produced by the coincidence of a negative input voltage on the inch input terminal B from the logic circuit through resistor R312 which extends to the base of Q311 through CR312 and the unclamping from ground of CR312 by a true voltage on CR222 which is coupled to the collector Q221 and on CR31 which is coupled to the collector Q31 on an $S_2$ flip flop which functions in the same manner as the $S_1$ flip flop.

Counting

As more thoroughly discussed in conjunction with the above mentioned copending application, after a start indication is received from the digitizer the logic circuit is ready to receive actual counts or, in other words, the remote digitized information. The count output terminal is coupled through resistor R423 and diode CR421 to the collector of transistor Q421 whose base is driven by a transistor Q411. Transistor Q411 in turn has its base coupled to an OR gate consisting of diodes CR411 and CR412. The diodes have their other terminals terminated through resistors R412 and R413 on the negative voltage supply line. This negative actuating voltage supplied to the OR gate is normally clamped to ground by normally on transistors Q211, Q221 through diodes CR211 and CR224. However, as indicated in FIG. 4J a foot or coarse count is accomplished after a start pulse, which is also zero, by the successive production of pulses, as indicated by FIGS. 4E and 4F, alternately turning off transistors Q211 and Q221 and unclamping diodes CR211 and CR224. No count pulse is produced at the start $S_1$ since Q311 is on at this time which grounds or clamps CR313.

In the case of the inch counting mode (see FIG. 4K) the same technique is used for counting except that since the second start, $S_2$, is as an alternative start used for this count, production of a count while the commutator wiper passes the $S_2$ segment is prevented by the start transistor Q311 clamping CR313 ground.

Stop pulses

Control of ambiguity and gear backlash is provided by means of the odd-even flip flop, OE, comprising transistor Q11 and Q12 which is actuated by the inch photocathode input and indicates to the logic unit whether the foot count is to terminate on an even or odd count. This determination is made during the $S_1$ start pulse period. If at this time $S_1$ is opposite a reflective portion of the inch wheel, an odd count is indicated; if $S_1$ is opposite a black or non-reflective portion, an even count is indicated. More specifically, a stop pulse for the foot count is attempted to be produced by the photocathode of the scanning head sensing the foot mirror on the foot wheel. This places a positive voltage on the foot photocathode terminal and the base of Q71 turning it off thereby placing a negative voltage on the base of Q72 to turn it on. The collector of Q72 is coupled to the base of Q611 which is normally in an ON condition in view of its base connection to the negative voltage of the foot interrogate line A. The ON condition of Q611 therefore normally clamps the base of Q621 to ground making it immune from any negative "ON" pulse from C511. When, however, Q72 is switched ON by reception of a stop pulse, it clamps the base of Q611 to ground, making Q611 non-conductive and thereby releasing the clamp on Q621.

A negative "ON" pulse from C511 after Q621 is unclamped causes Q621 to clamp the base of NPN transistor Q631 to ground making it conductive. This applies the common negative voltage through series connected resistor R633 and diode CR631 to the STOP terminal thereby producing a stop pulse. Production of a negative pulse through C511 depends on the releasing of several clamps and the coincidence of several conditions as follows. The odd-even, OE, flip flop is coupled to the base of the transistor Q511 through an OR gate comprising diodes CR511 and CR512. The collector of Q511 is coupled to capacitors C511 which as mentioned above, controls production of a stop pulse. Diodes CR511 and CR312 are also coupled to foot interrogate line A, through resistors R514 and R513. A negative interrogate voltage will, absent any clamping action on CR512 or CR511, close transistor Q511 to allow capacitor C511 to be charged from the negative voltage supply.

As discussed above, since the odd or even foot determination is made during the time a wiper is passing over $S_1$, the $S_1$ flip flop must be in a true condition, as shown in FIG. 4B, when the inch wheel is sensed. With a clamp being applied by the $S_1$ terminal through CR11 a capacitor C21, coupled to the base of Q11, is also clamped to ground momentarily discharging it and causing the base input of transistor Q11 to go toward ground (FIG. 4L) to turn Q11 off. This is the odd foot condition of the OE flip flop in which Q11 is off or in a true condition and a ground clamp is removed from CR13 which is coupled to CR512. The OE flip flop will remain in this condition unless during the same $S_1$ starting pulse period (indicated by dashed pulse in FIG. 4L) an even indication is received from the inch photocathode input terminal. If such is the case a negative pulse (FIG. 4M) is produced on a conductor extending through CR12 to the base of Q11 of the OE flip flop to actuate Q11 switching it on an ON condition. Transistor Q12 is thereby switched to off, a true condition and a ground clamp is removed from CR14 which is coupled to CR511.

The negative pulse input (indicating an even stop) through CR12 to the base of Q11 is accomplished only by the releasing of three clamps to allow the negative foot interrogate voltage from terminal A to switch the OE flip flop. The first clamp to be released is on CR81 which is coupled through an amplifier to the inch photocathode terminal. Since the even or black area on the inch wheel produces no positive photocathode voltage output on the inch photocathode terminal, transistor Q81 is conductive grounding the base of transistor Q82, turning it off, and releasing any ground clamp to CR81. The next clamp is through CR22 which extends to the collector of $S_1$ flip flop transistor Q21 and which will also be unclamped due to the $S_1$ start pulse which has been previously received. Finally the clamp through CR221 which is coupled to the collector or transistor Q221 of the $P_{OE}$ flip flop is unclamped when an even pulse count or $S_1$ indicator is received. Lastly, of course, the negative voltage supply through R223 which is coupled to the foot interrogate line will only be present if the logic circuit has provided a negative voltage on that line. In operation, the state of the OE flip flop determines whether the base input Q511 is to be unclamped during an odd or even count to allow a stop pulse to be produced. FIG. 4N illustrates both cases, the crosshatched Q511 ON pulses representing an even stop pulse and the remaining ON pulses represent odd stop pulses. However, an actual stop pulse is not produced until Q511 is turned off after being turned ON by the unclamping. This ON or conductive state allows C511 to be discharged through R515 and Q511 to ground. Upon reclamping Q511, C511 begins to charge from the negative voltage supply and a negative stop pulse, as illustrated in FIG. 4P is produced which is discussed above switches Q621 to a conductive state.

In summary, the OE flip flop's determination of whether to stop on an odd or even count provides for an easy correction of mechanical errors and in addition corrects for ambiguity in the 0.99 to 0.00 area of measurement. A graphical illustration of the mechanical tolerances allowed is shown in FIG. 4Q. The pulse shown is the output of the foot photocathode amplifier which responds to the foot mirror. The pulse is substantially two pulse periods (FIG. 4P) long. The dashed lines extending to the possible stop pulses of FIG. 4P indicate the extent to which the foot stop mirror can be displaced from its optimum position.

An inch stop pulse is produced when the inch photocathode senses the inch wheel and senses a change from black (nonreflective) to white (reflective). This places a positive voltage on the inch photocathode terminal, placing Q82 in a nonconductive state. The clamp through CR82 and CR513 to QR511 is removed to allow a stop pulse to be produced in the same manner as with the foot reading. FIGS. 7A–D illustrate the position of inch wheel 22 when its movement has been arrested by odd-even selector 28 in four possible positions in the 0.00–0.99 ambiguity region. More specifically, each figure has indicated thereon whether the foot reading is even or odd as determined by the setting of the odd-even flip flop at the $S_1$, start and the appropriate inch reading of .00 feet or .99 feet. The numbering around the periphery of the inch wheel between $S_1$ and $S_2$ conforms to an inverted FIG. 6 which of course is the actual assembled condition.

FIGS. 8A–D illustrate an alternative embodiment for the fine or inch wheel which replaces the 180 degree black and white sectors with a single reflective mirror 101 (FIG. 8A). The fine photocathode can then be adjusted to respond to the leading edge of this mirror to approach the desired infinitesimal separation between the odd and even regions. A flip flop would be provided labeled flip flop A (FIG. 8B) coupled to the $S_1$ and $S_2$ start commutator circuit portions which would be placed in an up or true condition by the sensing of start $S_1$ and a down or false position upon the sensing of $S_1$. The initial condition of flip flop A would always be false and a start pulse would only be generated when the flip flop A proceeded from an up or true condition to an off or false condition. Thus the scanning procedure would require that the $S_2$ start be passed by the scanning head first to place flip flop A in a true condition and thereafter the change of condition of the flip flop by sensing of the $S_1$ start would cause the generation of a start pulse as shown in FIG. 8D. An odd-even (OE) flip flop similar to that provided in the first embodiment would be coupled both to the flip flop A and the inch photocathode input terminal. The odd-even flip flop would normally be in a false or ON condition indicating an odd foot. Reception of an inch photocathode pulse by the scanning of mirror 101 when in that sector between $S_2$ and $S_1$ would change the condition of the odd-even flip flop to an even or true. Thus the location of the mirror segment 101 can be indicated in this manner. The presence of the mirror in an odd sector (from $S_1$ to $S_2$) would have no effect on the odd-even flip flop since flip flop A is not in a proper coincidence or true condition AND gate.

FIG. 9 shows the block diagram of a typical telemetering station in which the block, MRD, represents the multiple revolution digitizer which is connected to a station that is similar to that disclosed in copending application Ser. No. 230,149. The terminals of the MRD also appear in FIG. 5. Two significant differences of the present application with that of the above mentioned copending application are that the digitizer has both a foot and inch interrogate input and the decimal counting amplifier (DCA) $N+1$ has a permanent negative voltage on it in order to maintain the odd-even selector 28 in an energized position during the entire information taking interval.

More specifically, the digitizers is coupled to a common logic unit 138 by conductors 139, 140, 141, and 142 which can be identified as common, start, information or count, and stop, lines respectively. An interrogate line 204 extends from the logic active terminals of a transmitting distributor 158 and is coupled to logic unit 138 and to the DCA unit $N+2$. The logic active terminal along with the check logic terminal to which line 201 is connected is an AND gate which allows a digital output only when all information has been stored in the decimal counting units 151. To initiate logic unit 138 an initiate line 150 is coupled to program control modules (PCM) N and $N+4$ through diodes 231. This actuates the interrogate line 204. However the DCA $N+1$ has been modified so that normally its interrogate line now has a permanent negative voltage on it. Both digitizer control amplifiers produce a negative interrogate pulse the output of DCA $N+1$ being coupled to foot interrogate line A and $N+2$ to inch interrogate line B.

As explained in the copending application the program control modules are sequentially actuated by the line 158 from the transmitting distributor labelel Program Advance Output. Program control module N provides a space in the teletype output for numerical information as received. Modules $N+1$ through $N+5$ control numerical information, $N+7$ controls the foot (′) mark and $N+8$ provides a space. More specifically, control module N initiates the central logic unit through the transistor 231, and the initiate line 150. Concurrently this same signal is applied through diode 232 to digitizer control amplifier $N+1$ placing a negative voltage on the foot interrogate line. At the same time an output through diode 233 and resistor 234 is coupled to a diode matrix 156 to produce a space. After this function has been performed program control module $N+1$ is activated by the program advance output to sustain the activated digitizer control amplifier $N+1$ through a diode 247. In addition, the output of PCM $N+1$ through diode 253 is coupled to the check logic line 201 to indicate that foot data has been stored in decimal counting units 151 and may now be read out. A print instruction through diode 248 which is coupled into an interrogate terminal of the 100's, decimal counting unit 151 is actuated to cause the read out of information in this unit. Thereafter program control modules $N+2$ and $N+3$ sustain the operation of the digitizer through diodes 247 thereby keeping the selector 28 energized and in addition cause a print out of the tens decimal counting unit and the ones decimal counting unit.

Program control module $N+4$, which is the decimal point module, continues the initiation of the central control logic 138 through diode 231 in the same manner as the program control module N and more importantly, activates digitizer control amplifier $N+2$ through diode 232. Digitizer control amplifier $N+2$ places negative voltage on the inch interrogate terminal. Printing of the decimal point is caused through diodes 233 and resistor 234 which are a series coupled from the output of the $N+4$ module to a decimal point print input of diode matrix 156. An advance to program control module $N+5$ sustains digitizer control amplifier $N+2$ through diodes 247. A check logic connection through diode 253 indicates that data now has been gathered and stored in the decimal counting units and a print out is started of the inch information. A shift to program control module $N+7$ prints the foot mark by means of an output coupled through diode 233 and resistor 234, to the foot mark input of diode matrix 156. The last shift to $N+8$ prints another space by the space input to the diode matrix. Thereafter the program control module system may shift to the next digitizer as explained in the above copending application. In all other respects the more detailed operation of the system is similar.

From the foregoing, it is apparent that the multiple revolution digitizer even though measuring both feet and hundredths of a foot is very compatible with existing telemetering systems of the type disclosed in the above copending application.

In addition to compatibility, the present invention also provides a digitizer which easily handles analog information having a wide range and accomplishes this without complicated mechanical or electrical arrangements.

Although the preferred embodiment has shown the invention in the context of a digitizer which produces a serial pulse train of digital information, the invention is also applicable to other classes of digitizers; for example, a digitizer having a statically read binary code wheel. In the latter type digitizer it would be obvious to provide a smoothly geared or non-detented type fine-coarse wheel system in which the coarse wheel represents a predetermined number of units of measurement and the fine wheel corrects for possible ambiguity between two adjacent coarse wheel units by the use of two coarse units deployed on the fine wheel.

I claim:

1. In a digital data system and apparatus of the type adapted to indicate the extent of displacement of an element from a base position by a plurality of pulses transmitted to a remote receiving station, first rotatable means releasably coupled to said element and adapted to be rotated in proportion to the displacement of said element, second rotatable means co-operating and concentric with said first rotatable means, transfer means connecting said first and second rotatable means for causing said second rotatable means to move a fraction of a revolution in response to one revolution of such first rotatable means, said first and second rotatable means each including indicating means carried thereon, scanning means for sensing the angular positions of said indicating means, digitizer means coupled to said scanning means and producing electrical pulses in response to movement of said scanning means, the number of said pulses indicating the angular position of each of said indicating means whereby both coarse and fine information is produced as to the displacement of said element said first rotatable means providing coarse information and said second rotatable means providing fine information, means responsive to activation of said scanning means for arresting movement of said first rotatable means in at least two different angular positions, and ambiguity resolving means included in said digitizer means to produce either an odd or even number of pulses in accordance with the arrested position of said first rotatable means.

2. Apparatus as in claim 1 where said releasable coupling between said element and said first rotatable means is magnetic.

3. In a digital data system and apparatus of the type adapted to indicate the extent of displacement of an element from a base position by a plurality of pulses transmitted to a remote receiving station, first rotatable means coupled to said element and adapted to be rotated in proportion to the displacement of said element, second rotatable means co-operating and concentric with said first rotatable means, transfer means connecting said first and second rotatable means for causing said second rotatable means to move a fraction of a revolution in response to one revolution of such first rotatable means, said first and second rotatable means each including indicating means carried thereon, scanning means for sensing the angular positions of said indicating means, digitizer means coupled to said scanning means and producing electrical pulses in response to movement of said scanning means, the number of said pulses indicating the angular position of each of said indicating means whereby both coarse and fine information is produced as to the displacement of said element said first rotatable means providing coarse information and said second rotatable means providing fine information, means responsive to activation of said scanning means for limiting rotation of the indicating means of said first rotatable means to one of the two sectors of a reference circle in which said two sectors form a total circle, and ambiguity resolving means included in said digitizer means for conditioning said digitizer means to produce either and odd or even number of pulses in accordance with the position of the indicating means of said first rotatable means in said first and second sectors.

4. In a digital data system an apparatus of the type adapted to indicate the extent of displacement of an element from a position by a plurality of pulses transmitted to a remote receiving station, said apparatus comprising first rotatable means coupled to said element and adapted to be rotated in proportion to the displacement of said element, second rotatable means cooperating and concentric with said first rotatable means, transferring means connecting said first and second rotatable means for causing said second rotatable means to move a fraction of a revolution in response to one revolution of said first rotatable means, said first and second rotatable means each including indicating means carried thereon, scanning means for sensing the positions of said indicating means, digitizer means coupled to said scanning means and producing electrical pulses in response to movement of said scanning means, the number of said pulses indicating the angular position of each of said indicating means whereby both coarse and fine information is produced as to the displacement of said element and said first rotatable means providing coarse information and said second rotatable means providing fine information, means responsive to activation of said scanning means for allowing rotation of the indicating means of said first rotatable means only within one of two sectors of a reference circle in which said two sectors form a total circle, whereby if said indicating means of said first member is not at the limit of its movement said indicating means continues rotation in response to displacement of said element even during scanning by said scanning means to produce on line fine information.

5. Apparatus as in claim 4 where said sectors are 180 degree portions of said circle.

6. Apparatus as in claim 5 which includes commutator means associated with said scanning means for producing a start pulse when said scanning means passes one of said 180 degree points.

References Cited

UNITED STATES PATENTS

| | | | |
|---|---|---|---|
| 2,779,539 | 1/1957 | Darlington | 235—154 |
| 2,793,807 | 5/1957 | Yaeger | 340—347.4 |
| 3,320,805 | 5/1967 | Kahle | 340—206 |

JOHN W. CALDWELL, Primary Examiner

C. MARMELSTEIN, Assistant Examiner

U.S. Cl. X.R.

340—190, 347